US012599516B2

(12) United States Patent
Daouk

(10) Patent No.: US 12,599,516 B2
(45) Date of Patent: Apr. 14, 2026

(54) COLLAPSIBLE STRETCHER

(71) Applicant: Antar Daouk, Paris (FR)

(72) Inventor: Antar Daouk, Paris (FR)

( * ) Notice: Subject to any disclaimer, the term of this patent is extended or adjusted under 35 U.S.C. 154(b) by 302 days.

(21) Appl. No.: 18/272,914

(22) PCT Filed: Jan. 17, 2022

(86) PCT No.: PCT/FR2022/050092
§ 371 (c)(1),
(2) Date: Jul. 18, 2023

(87) PCT Pub. No.: WO2022/157447
PCT Pub. Date: Jul. 28, 2022

(65) Prior Publication Data
US 2024/0082076 A1 Mar. 14, 2024

(30) Foreign Application Priority Data
Jan. 19, 2021 (FR) ........................................ 2100497

(51) Int. Cl.
*A61G 1/013* (2006.01)

(52) U.S. Cl.
CPC .................................... *A61G 1/013* (2013.01)

(58) Field of Classification Search
CPC .................................. A61G 1/00; A61G 1/013
See application file for complete search history.

(56) References Cited

U.S. PATENT DOCUMENTS

| | | | | |
|---|---|---|---|---|
| 1,129,089 A * | 2/1915 | Hajas | A61G 1/013 5/57.1 |
| 3,426,367 A | 2/1969 | Bradford | |
| 4,685,161 A * | 8/1987 | Zalman | A61G 1/013 403/93 |
| 4,799,274 A | 1/1989 | Dommerud | |
| 8,127,381 B2 * | 3/2012 | Westmoreland, II | A61G 1/013 5/176.1 |
| 11,679,042 B2 * | 6/2023 | Fanelli | A61G 1/042 5/625 |
| 2012/0066836 A1 | 3/2012 | Kaarstein et al. | |

* cited by examiner

*Primary Examiner* — Fredrick C Conley
(74) *Attorney, Agent, or Firm* — Nath, Goldberg & Meyer; Joshua B. Goldberg

(57) ABSTRACT

The invention relates to a stretcher comprising first and second support arms to which and between which a means for receiving an individual is intended to be attached, said first arm comprising first and second end elements, and also a first cable attached to said end elements in order to be tensioned between these in a first longitudinal direction, said stretcher comprising a first crosspiece connected to said first and second arms, positioned between the latter and designed to change between retracted and deployed configurations, such that, in the retracted configuration, said first element and first crosspiece are connected by a mechanical connection permitting a degree of freedom in translation in said first direction, and such that, in the deployed configuration, said connection inhibits said degree of freedom. The invention is particularly suitable for the production of stretchers having a reduced size when not in use.

17 Claims, 17 Drawing Sheets

COLLAPSIBLE STRETCHER

This is a National Phase Application filed under 35 U.S.C. 371 as a national stage of PCT/FR2022/050092, filed Jan. 17, 2022, an application claiming the benefit of French Application No. 2100497, filed Jan. 19, 2021, the content of each of which is hereby incorporated by reference in its entirety.

TECHNICAL FIELD

The present invention concerns the general technical field of stretchers, and more particularly that of stretchers intended to be collapsed (and in particular dismounted), when not in use in order to have a reduced size.

The present invention concerns more specifically a stretcher comprising a first and a second support arm to which and between which a means for receiving an individual is intended to be attached, said first arm comprising at least one first and one second end element, as well as at least one first cable attached to said first and second end elements and intended to be stretched between the latter in a first longitudinal direction.

PRIOR TECHNIQUE

The stretchers (sometimes called gurneys) are commonly used for the evacuation of injured people, usually in a seated or lying position. They generally comprise two parallel arms connected to a person receiving support, or even a tubular frame between which the receiving support is fixed. More particularly, so-called collapsible, that is to say dismountable, stretchers make it possible to reduce the size of these devices, and thus have the advantage of being able to be transported more easily, in particular within already cluttered vehicles (helicopters, ground rescue vehicles, ships, military vehicles, etc.) or by the users themselves (for example mountain rescuers, military, paratroopers, etc.).

It is thus known to implement a collapsible stretcher comprising a kit of hollow tube sections, whose assembly makes it possible to obtain a stretcher structure with two arms. To mount each arm, the assembly of the tube sections is in particular made by fitting the latter in each other, one after the other. In order to improve the rigidity of the arm, a cable, inserted within the tube sections, is tensioned by means of a tensioning device, which comprises a lever fixed to one end of the cable. To achieve cable tension, the lever, positioned at one end of the arm, is tilted perpendicular to the arm and attached to the similar lever of the other arm. The other end of the cable is attached to a tube section located at the opposite end of the arm. Rigid plates, each fixed to two of the tube sections, form, once the kit is assembled, a substantially plane person receiving support.

These known collapsible stretchers are generally satisfactory, but could still be improved, and in particular optimized to further reduce their size and improve their practicality, in order to satisfy increasingly drastic constraints of use.

Indeed, these known collapsible stretchers have a size and a weight which are, although already reduced, still perfectible, that is to say it is desired to increase the compactness of these stretchers while maintaining a reduced weight, or even reducing the latter. There is thus a need for collapsible stretchers having the smallest possible dimensions, when not in use, in order to be able to easily transport said stretchers everywhere, whether in a vehicle or by an individual (rescuer at sea or in the mountains for example). Moreover, the procedure for tensioning the cables implemented in these known stretchers may be considered by some users to be relatively complex or tedious, without however guaranteeing the reproduction at each stretcher assembly of the same level of tension of the cables. The mounting of these known collapsible stretchers further requires a minimum of physical strength and skill, which may prove to be restrictive depending on the capabilities of the user or the context of use. In addition, the duration of mounting and dismounting of these known collapsible stretchers, if acceptable, would nevertheless benefit from being optimized, just as the mounting of these stretchers would benefit from being made even simpler and more practical, to facilitate their use in emergency situations. Finally, if these known stretchers turn out to be perfectly adapted to the various mechanical constraints imposed in use, their solidity and their safety could still be improved, in particular to meet, or anticipate, specifications (customer specifications, official standards) increasingly stringent, which sometimes go well beyond the standard mechanical constraints to which this type of equipment is likely to be exposed.

DISCLOSURE OF THE INVENTION

The objects assigned to the present invention therefore aim to remedy the various drawbacks listed above and to propose a new stretcher which, while being particularly robust, reliable and durable, has a reduced size, in particular in the collapsed or dismounted configuration, while being particularly simple and practical to use.

Another object of the invention aims to propose a new stretcher whose mounting and dismounting are both quick and easy.

Another object of the invention aims to propose a new stretcher intended to receive a person in optimal safety and comfort conditions, both for the individual on board the stretcher and for any operators or rescuers transporting said stretcher.

Another object of the invention aims to propose a new stretcher whose structure provides it, in particular in the mounted configuration, with optimal solidity and rigidity.

Another object of the invention aims to propose a new stretcher which requires only minimal maintenance.

Another object of the invention aims to propose a new stretcher whose weight is reduced.

Another object of the invention aims to propose a new stretcher whose manufacture is simple and carried out at controlled cost.

Another object of the invention aims to propose a new stretcher which is light and compact enough to be able to be easily embedded by a wide variety of vehicles and individuals.

Another object of the invention aims to propose a new stretcher whose structure is simple and comprises only a limited number of distinct parts.

Another object of the invention aims to propose a new stretcher whose structure is durable and particularly resistant to wear.

The objects assigned to the present invention are achieved with the aid of a stretcher comprising a first and a second support arm to which and between which a means for receiving an individual is intended to be attached, for example a canvas structure, said first arm comprising at least one first and one second end element, as well as at least one first cable attached to said first and second end elements and intended to be stretched between the latter in a first longitudinal direction, said stretcher being characterized in that it comprises at least one first crosspiece connected to said first and second arms and positioned at least partly between the latter, said first crosspiece being designed to move between a retracted configuration and a deployed configuration in which said first crosspiece maintains said first and second arms more distant from each other than in said retracted configuration, said first crosspiece cooperating at least with said first end element so that in retracted configuration said first end element and first crosspiece are connected between them by a mechanical connection allowing at least one degree of freedom in translation along said first longitudinal direction, and so that in the deployed configuration said mechanical connection inhibits at least said degree of freedom in translation along said first longitudinal direction.

BRIEF DESCRIPTION OF THE DRAWINGS

Other objects and advantages of the invention will emerge in more detail on reading the following description, and with the aid of the appended figures provided for purely explanatory and non-limiting purposes, in which.

BEST WAY TO REALIZE THE INVENTION

Figure 1:
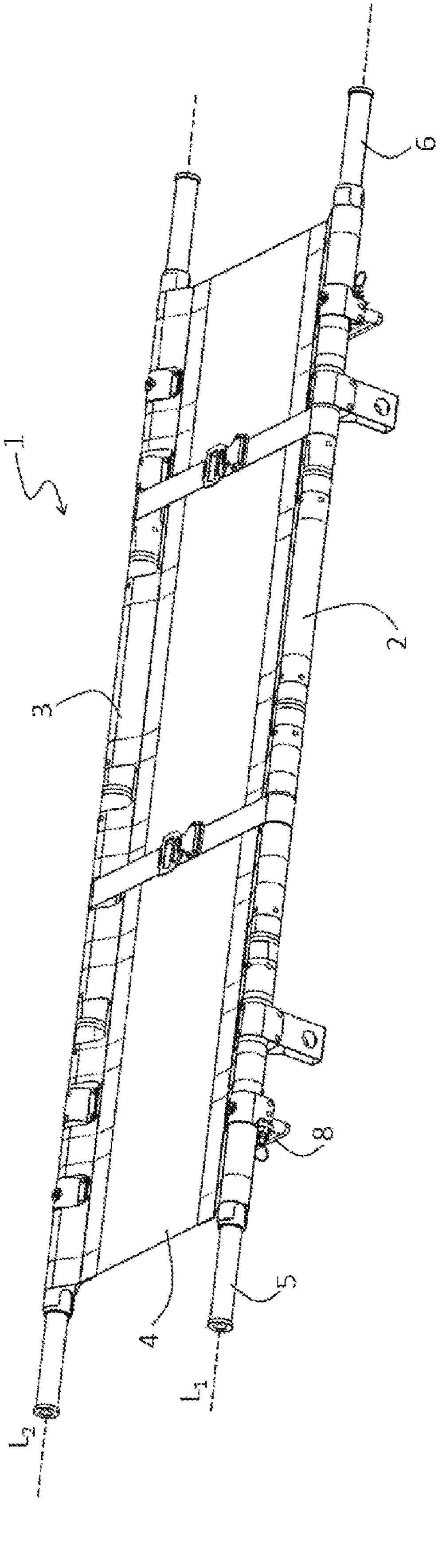
FIG. 1 schematically illustrates, in a top perspective view, a stretcher in accordance with the invention according to a particular embodiment, the stretcher being assembled and ready to be used.
Figure 2:
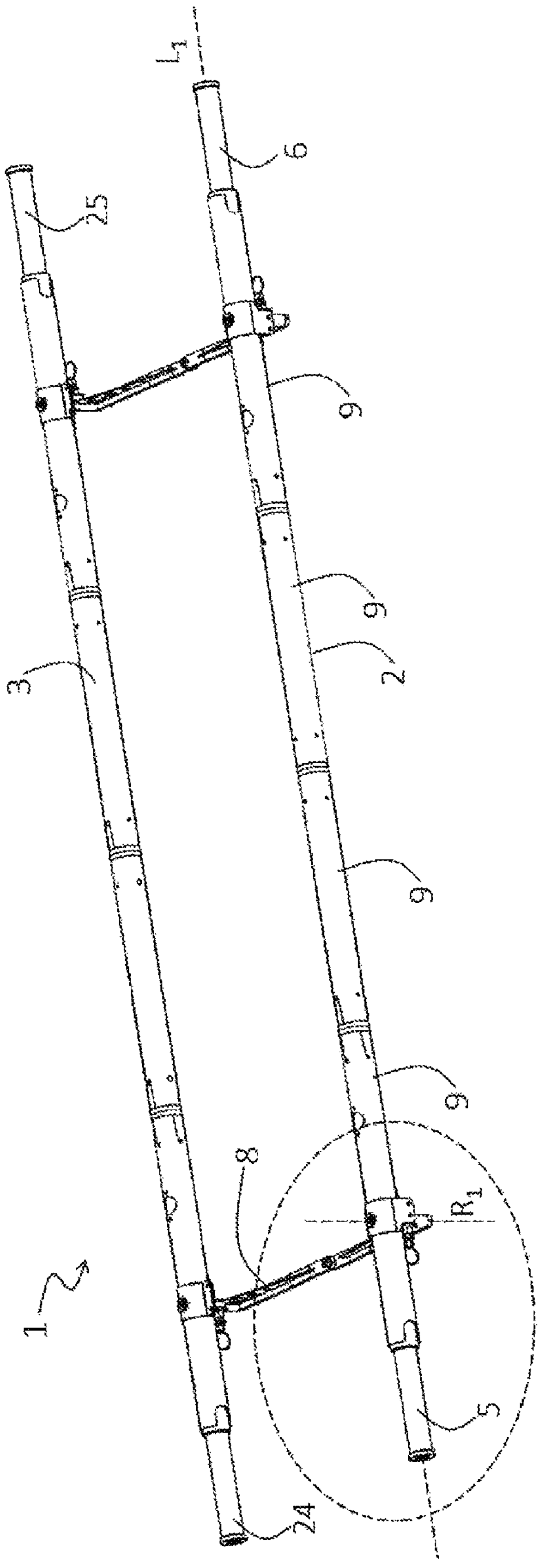
FIG. 2 schematically illustrates, in a top perspective view, the stretcher of FIG. 1, the crosspieces still being in the deployed configuration, but where certain elements such as the means for receiving an individual and clamps are not shown.
Figure 3:
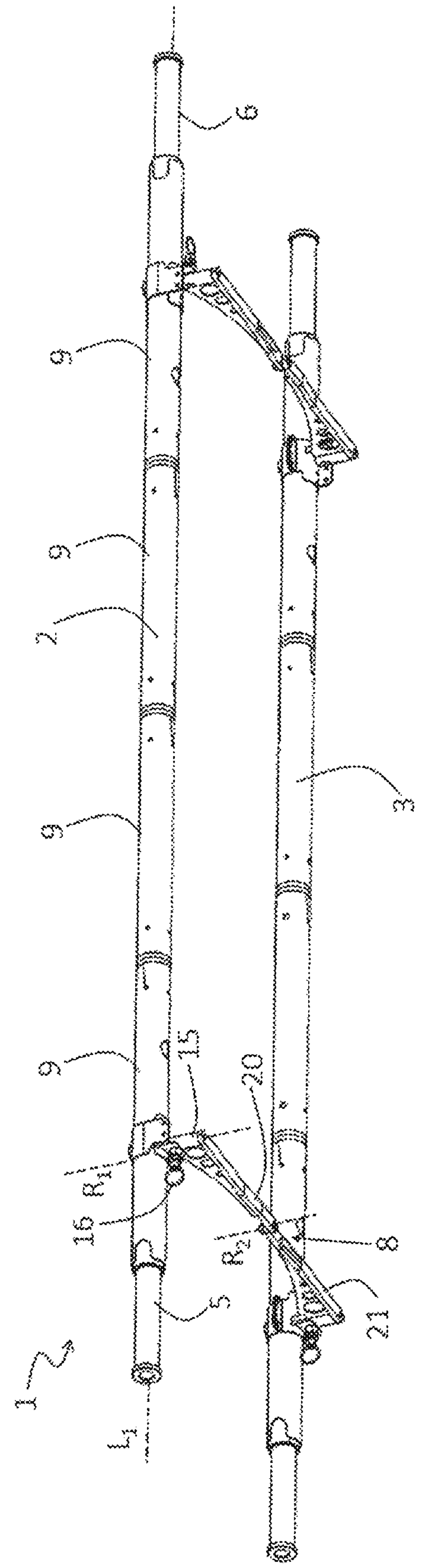
FIG. 3 schematically illustrates, in a bottom perspective view, the stretcher of FIG. 2.
Figure 4:
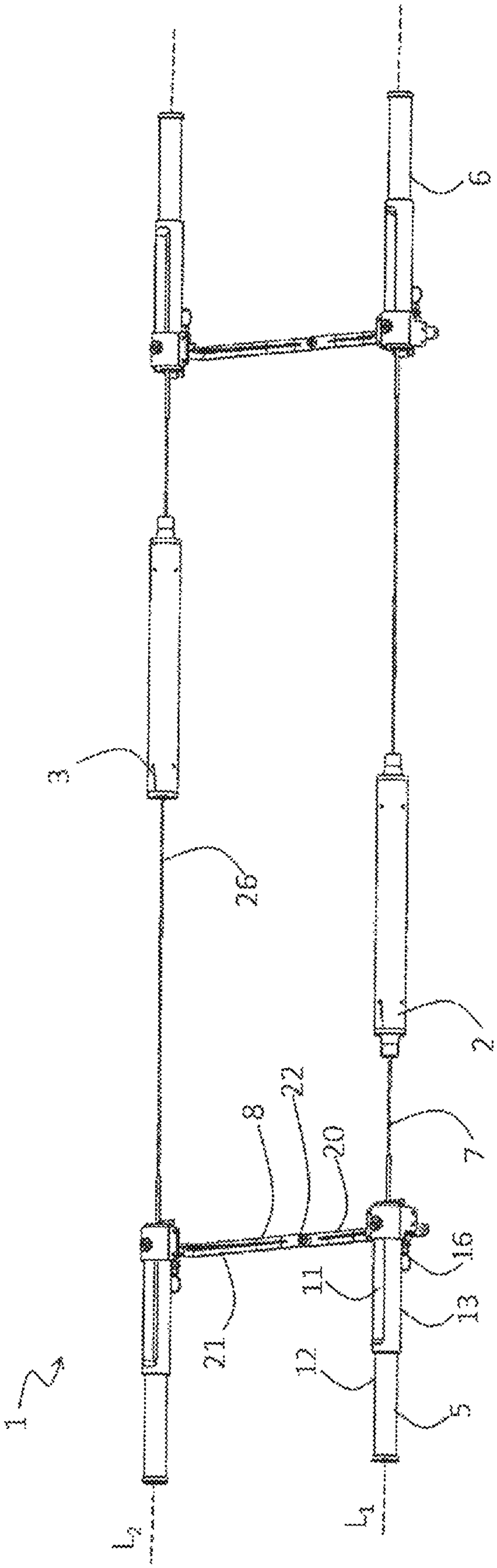
FIG. 4 illustrates schematically, in a top perspective view, the stretcher of FIG. 2, with the difference that several sections have been hidden, thus revealing the cables.

The invention concerns, according to a first aspect illustrated in the figures, a stretcher 1. The stretcher 1 preferably forms a gurneys device used to transport an individual whose condition (wounded, sick, unconscious, deceased, etc.) requires the lying down or, alternatively, sitting. More particularly, said stretcher 1 is collapsible or foldable, that is to say it is advantageously designed to, when not in use, be stored and transported in a collapsed and/or dismounted configuration. This makes it possible, as will be seen in more detail later, to give the stretcher 1 of the invention a particularly compact character when not in use, that is to say when the stretcher is not implemented to transport an individual and is therefore collapsed on itself and/or dismounted. The expression «collapsible (or foldable) stretcher» advantageously covers both the collapsible nature of the stretcher 1 and its dismountable nature.

According to the invention, the stretcher 1 comprises at least one first and one second support arm 2, 3 to which and between which a means of receiving an individual 4 (and/or material, optionally) is intended to be attached. Thus, the stretcher 1 (when it is obviously mounted) is advantageously designed for the transport, in particular by stretcher bearers, rescuers and/or a specific vehicle (snowmobile, helicopter, ambulance, etc.), of said individual who is usually in lying or seated position, on the receiving means 4. The latter is therefore preferably bordered and/or framed on each side (longitudinally) by the first and second support arms 2, 3, which are themselves, advantageously, located on either side of said receiving means 4.

Said receiving means 4 is, according to a first variant, advantageously flexible, that is to say it does not have its own mechanical strength. It then comprises for example a (flexible) fabric, said fabric being formed of any suitable material, and therefore comprising for example textile (woven or not), natural and/or synthetic materials, etc. According to this last variant, the receiving means 4 can advantageously be intended to be stretched between said first and second arms 2, 3. The receiving means 4, when it is flexible, can therefore be deformed to be adapted to the shape of the body of the individual embedded by the stretcher 1. According to a second variant, the receiving means 4 is substantially rigid, that is to say it has its own mechanical strength. In this last variant, once the stretcher 1 is assembled, the receiving means 4 can advantageously be substantially flat. The receiving means 4, when it is rigid, can be composed of several separate plates, interconnected by said first and second arms 2, 4, said plates possibly being designed to be collapsed over each other. Optionally, at least one of said plates is articulated, that is to say formed of two secondary plates connected to each other in rotation, for example by a common hinge. The stretcher 1 advantageously comprises at least the structural elements necessary for supporting the receiving means 4, and in particular said first and second arms 2, 3. Of course, the stretcher 1 can also comprise the receiving means 4 as such.

Each arm 2, 3 advantageously has, when the stretcher 1 is mounted, a substantially elongated and substantially rigid respective general shape. Thus, each arm 2, 3 preferably has its own mechanical strength and extends in a respective longitudinal direction. For example, said first arm 2 being in the first longitudinal direction $L_1$ described below, and said second arm 3 extends in the second longitudinal direction $L_2$ also described below. The first and second arms 2, 3 are preferably substantially parallel to each other, when the stretcher 1 is mounted. Said first longitudinal direction Lu and second longitudinal direction $L_2$ are therefore preferably, when the stretcher 1 is mounted (in the deployed configuration as will be seen below), substantially parallel.

According to the invention, said first arm 2 comprises at least one first and one second end element 5, 6, as well as at least one first cable 7, attached to said first and second end elements 5, 6 and intended to be stretched between the latter in a first longitudinal direction $L_1$. Said first cable 7 is advantageously flexible, that is to say it does not have its own mechanical strength. The mounting of the stretcher 1 thus advantageously comprises the tensioning of the first cable 7 in order to increase the rigidity of said first arm 2. The first cable 1 advantageously does not present a significant stretching during this tensioning, said stretching being for example less than or equal to 20%, preferably less than or equal to 10%, more preferably less than or equal to 5%, more preferably still less than or equal to 3%, that is to say the length of the stretched cable (at its final tension) is a maximum of 20%, 10%, 5%, or 3% greater than the length of the slack cable. Said first and second end elements 5, 6 advantageously form handles of said stretcher 1. Preferably, with the obvious exception of the first and second end elements 5, 6 themselves, essentially, almost all or all of the elements forming said first arm 2 extend between said first and second end elements 5, 6, preferably along said first longitudinal direction $L_1$. The first cable 7 is for example made of metal, in particular steel, and/or of another material (carbon, polymer, Kevlar, etc.) or a combination of several materials.

According to the invention, the stretcher 1 comprises at least one first crosspiece 8 connected to said first and second arms 2, 3 and positioned at least partly between the latter. Said first crosspiece 8 is designed to move between a retracted configuration and a deployed configuration in which said first crosspiece 8 holds said first and second arms 2, 3 further apart than in said retracted configuration. In other words, said first crosspiece 8 is advantageously designed to allow the separation of said first and second arms 2, 3, this separation being advantageously adjustable or controllable, and more precisely greater when the first crosspiece is in the retracted configuration than when is in deployed configuration. The deployed configuration advantageously corresponds to the maximum spacing of the first and second arms 2, 3, when the stretcher 1 is mounted and ready to be used, while the retracted configuration preferably corresponds to spacings of the first and second arms 2, 3 which are less than the maximum spacing, these lower spacings corresponding to a state of the stretcher 1 completely dismounted (therefore ready to be stored and/or transported) or being mounted, that is to say partially dismounted. Said first crosspiece 8 is thus advantageously formed by a spacer, preferably collapsible as will be seen below, connecting said first arm 2 to said second arm 3.

The stretcher 1 being advantageously designated as collapsible, foldable, and/or dismountable, the terms «dismounted», «not in use», «collapsed», and the like preferably designate a state in which the stretcher 1 is in mounting or completely dismounted in order to be able to be stored and/or transported, as well as the retracted configuration of the first crosspiece 8. Conversely, the terms «mounted», «in use», «unfolded», «assembled», and the like advantageously designate a state in which the stretcher 1 is completely assembled and ready to be used (notwithstanding the possibly subsequent mounting of the receiving means 4, or rather its attachment to the arms 2, 3), as well as the deployed configuration of said first crosspiece 8.

According to the invention, said first crosspiece 8 cooperates (mechanically) at least with said first end element 5 so that, in the retracted configuration, said first end element 5 and first crosspiece 8 are connected together by a mechanical connection allowing the at least one degree of freedom in translation along said first longitudinal direction $L_1$, and so that, in the deployed configuration, said mechanical connection inhibits at least said degree of freedom in translation along said first longitudinal direction $L_1$. Thus, advantageously, in said retracted configuration (that is to say when said first crosspiece 8 is in the retracted configuration), said mechanical connection allows said first end element 5 to perform (compared to other elements of the first arm 2, for example relative to said first crosspiece 8), at least one translation along said first longitudinal direction $L_1$, while in said deployed configuration (that is to say when said first crosspiece 8 is in the deployed configuration), said mechanical connection prevents said first end element 5 from performing (relative to other elements of the first arm 2, for example relative to said first crosspiece 8), a translation in said first longitudinal direction $L_1$. In other words, preferably, in the retracted configuration, the stretcher 1 is designed so that the mechanical connection between said first crosspiece 8 and said first end element 5 allows the latter to be displaced in translation in the first longitudinal direction $L_1$, while in the deployed configuration, the stretcher 1 is designed so that the mechanical connection between said first crosspiece 8 and said first end element 5 blocks the latter so as to prevent it from being displaced in translation at least according to the first longitudinal direction $L_1$. In other words again, in the retracted configuration, the mechanical connection between said first crosspiece 8 and said first end element 5 allows the increase (or decrease) of the tension of the first cable 8 thanks to at least one displacement in translation of the first end element 5 along the first longitudinal direction $L_1$, while in the deployed configuration, the mechanical connection between said first crosspiece 8 and said first end element 5 inhibits the variation of the tension of the first cable 8 by preventing the translational displacement of the first end element 5 in the first longitudinal direction $L_1$. Said first crosspiece 8 and said first end element 5 are therefore advantageously in mechanical cooperation so that:

when the first crosspiece 8 is in the retracted configuration (whether partially or totally), the mechanical connection connecting said first end element 5 and first crosspiece 8 authorizes at least one degree of freedom in translation of the first end element 5 with respect to said first crosspiece 8 in said first longitudinal direction $L_1$, and when the first crosspiece 8 is in the deployed configuration, the mechanical connection connecting said first end element 5 and first crosspiece 8 inhibits at least said degree of freedom in translation of the first end element 5 with respect to said first crosspiece 8 according to said first longitudinal direction $L_1$.

Thus, in the retracted configuration, the displacement in translation along the first longitudinal direction $L_1$ authorized by said mechanical connection between said first crosspiece 8 and first end element 5 is, according to a first advantageous variant, constituted by a displacement of said first end element 5, and according to a first alternative variant, constituted by a displacement of said first crosspiece 8, or alternatively constituted by a displacement of said first crosspiece 8 and a displacement of said first end element 5.

Advantageously, said (mechanical) cooperation between said first end element 5 and said first crosspiece 8 is direct, that is to say said first end element 5 and said first crosspiece 8 interact mechanically directly with each other to form the mechanical connection which connects them, preferably without an intermediate element positioned between them to ensure the latter.

Figure 7:
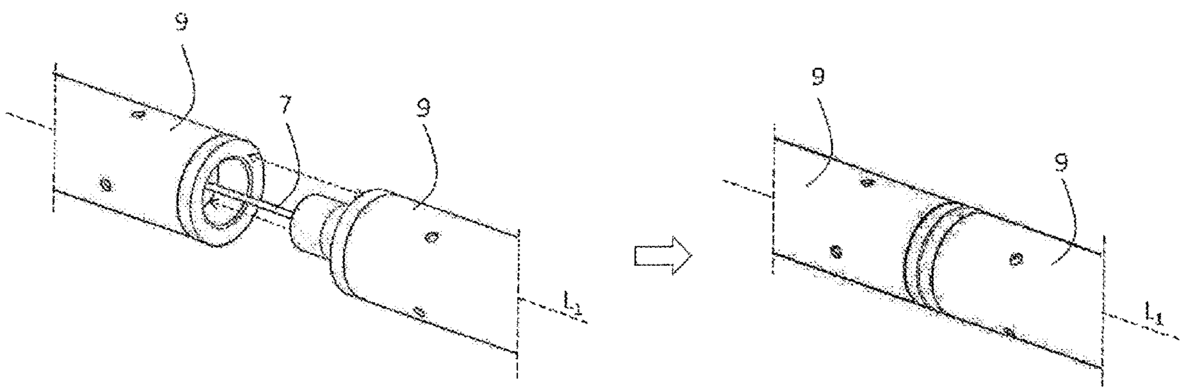
FIG. 7 schematically illustrates, in a perspective view, an enlargement of a detail of the constituent elements of the stretcher of FIG. 6, during the mounting.

According to a particular variant of the invention, illustrated in the figures, said first arm 2 comprises a plurality of first tubular and hollow sections 9, which are designed to mechanically cooperate with each other, for example by interlocking with each other, in the extension of each other, preferably in said first longitudinal direction $L_1$. Advantageously, said first cable 7 passes through said first sections 9 and therefore connects the latter to said first and second end elements 5, 6. Thus, said first cable 7 is preferably intended to be tensioned, preferably by translation at least from the first end element 5 along said first longitudinal direction $L_1$, in order to ensure the overall rigidity of the first arm 2. Indeed, the first cable 7, when it is tensioned, exerts tensile forces on the first and second end elements 5, 6 (since the first cable 7 is attached to the latter), these tensile forces being exerted on said first end element 5 towards said second end element 6 and on said second end element 6 towards said first end element 5. In other words, when the first cable 7 is tensioned, it will induce tensile forces bringing said first and second end element 5, 6 closer together, thereby wedging said first sections 9 between said first and second end elements 5, 6. One or more of said first sections 9 preferably has a respective substantially at least partly frustoconical shape, each frustoconical part of a first section 9 being advantageously intended to be inserted at least in part into the hollow of one of the other first sections 9 in order to achieve the mechanical interlocking cooperation mentioned above, as illustrated in FIG. 7. Some of said first sections 9 can also be attached to each other using rivets and/or using clamps, or any other appropriate mechanical means, in combination or alone. One or more of said sections 9 can be formed by assembling several respective components, for example using rivets. Said first sections 9 each for example comprise a respective elongated shape extending along said first longitudinal direction $L_1$ and having a preferably substantially circular cross-section, for example round, oval or elliptical, or alternatively substantially polygonal, for example square, rectangular or triangular.

Figure 5:
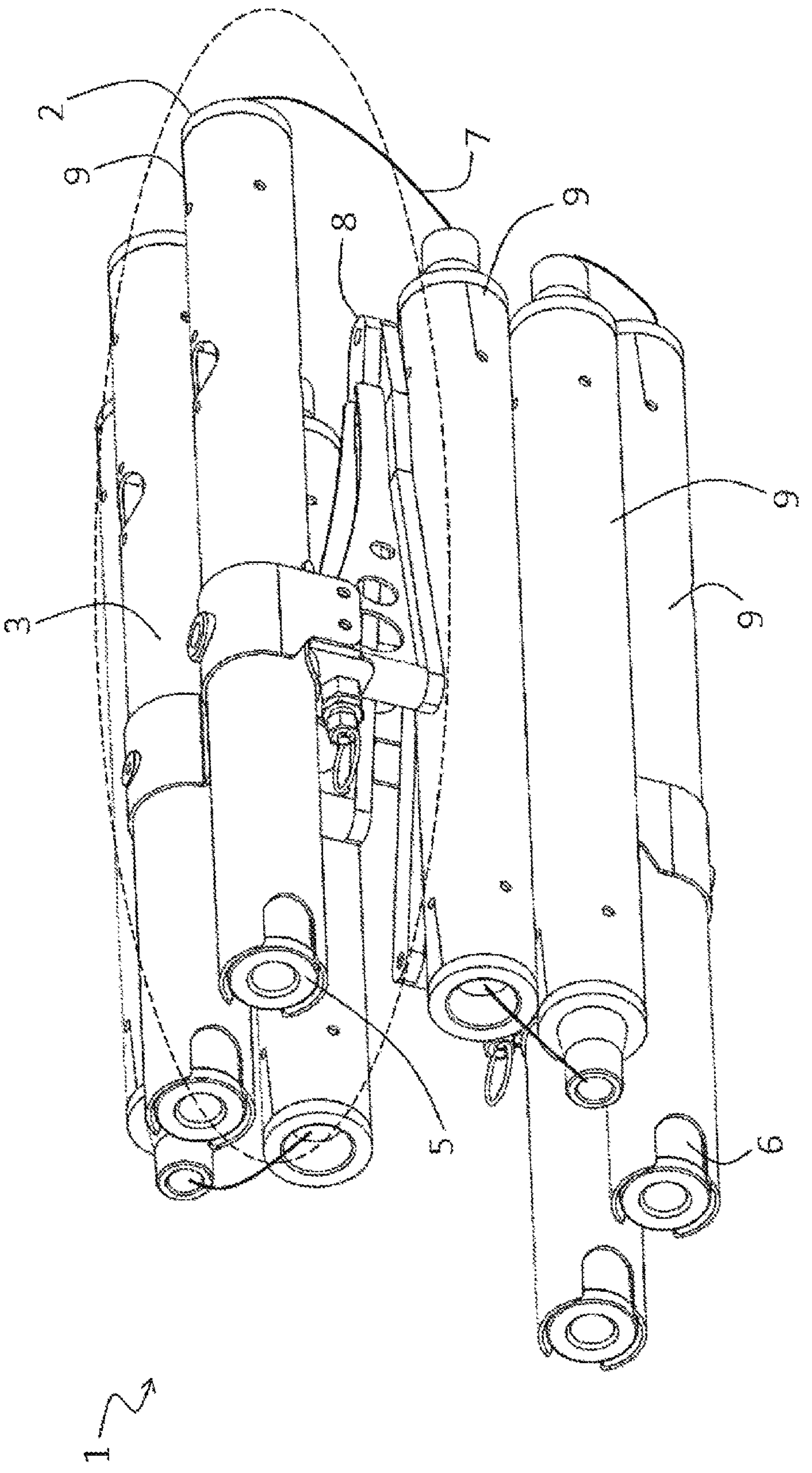
FIG. 5 illustrates schematically, in a perspective view, the stretcher of FIG. 2, completely collapsed, and therefore dismounted, the crosspieces therefore being in the retracted configuration (maximum).
Figure 6:
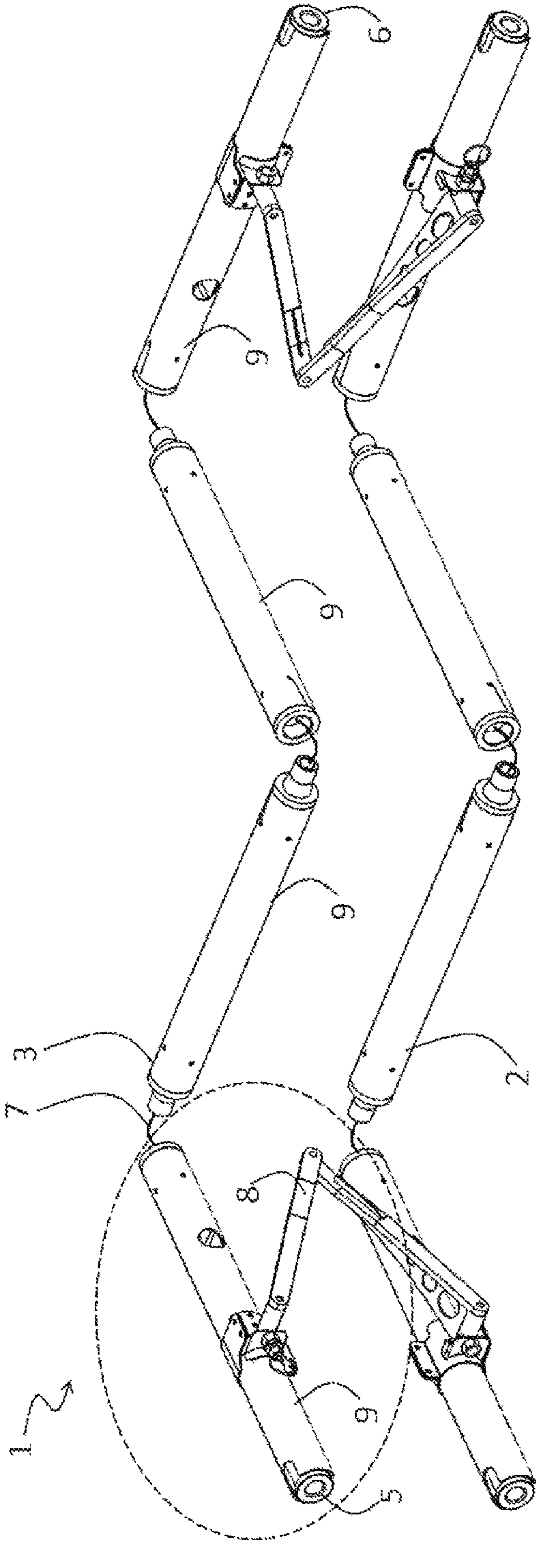
FIG. 6 schematically illustrates, in a bottom perspective view, the stretcher of FIG. 5 at the start of mounting, the crosspieces still being in the retracted configuration (non-maximum).
Figure 8:
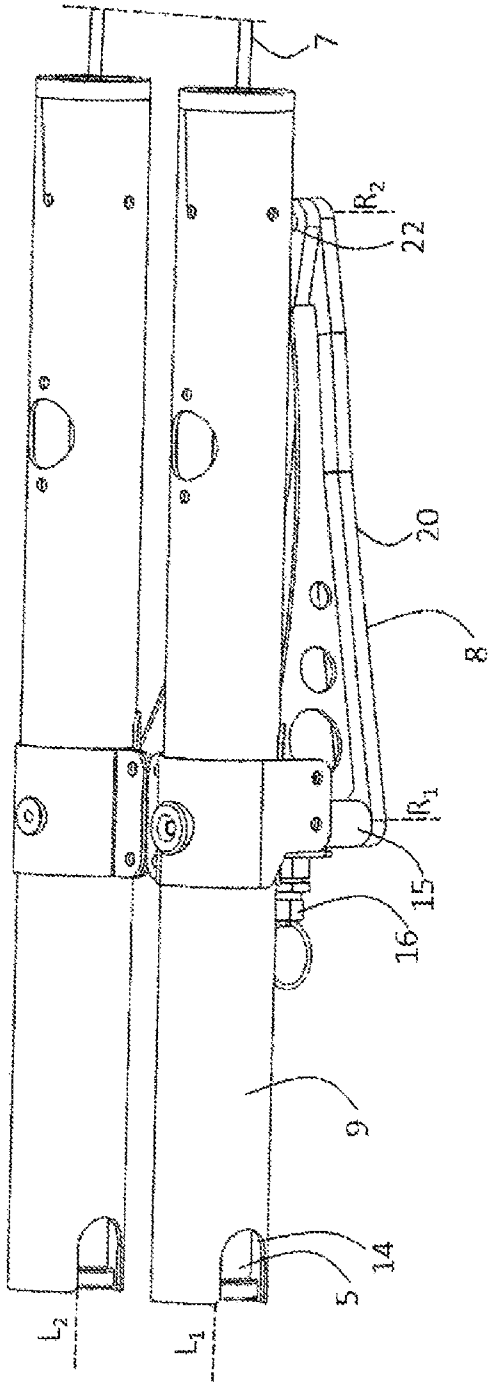
FIG. 8 illustrates, in a top perspective view, an enlargement of a detail of the constituent elements of the stretcher of FIG. 5.
Figure 9:
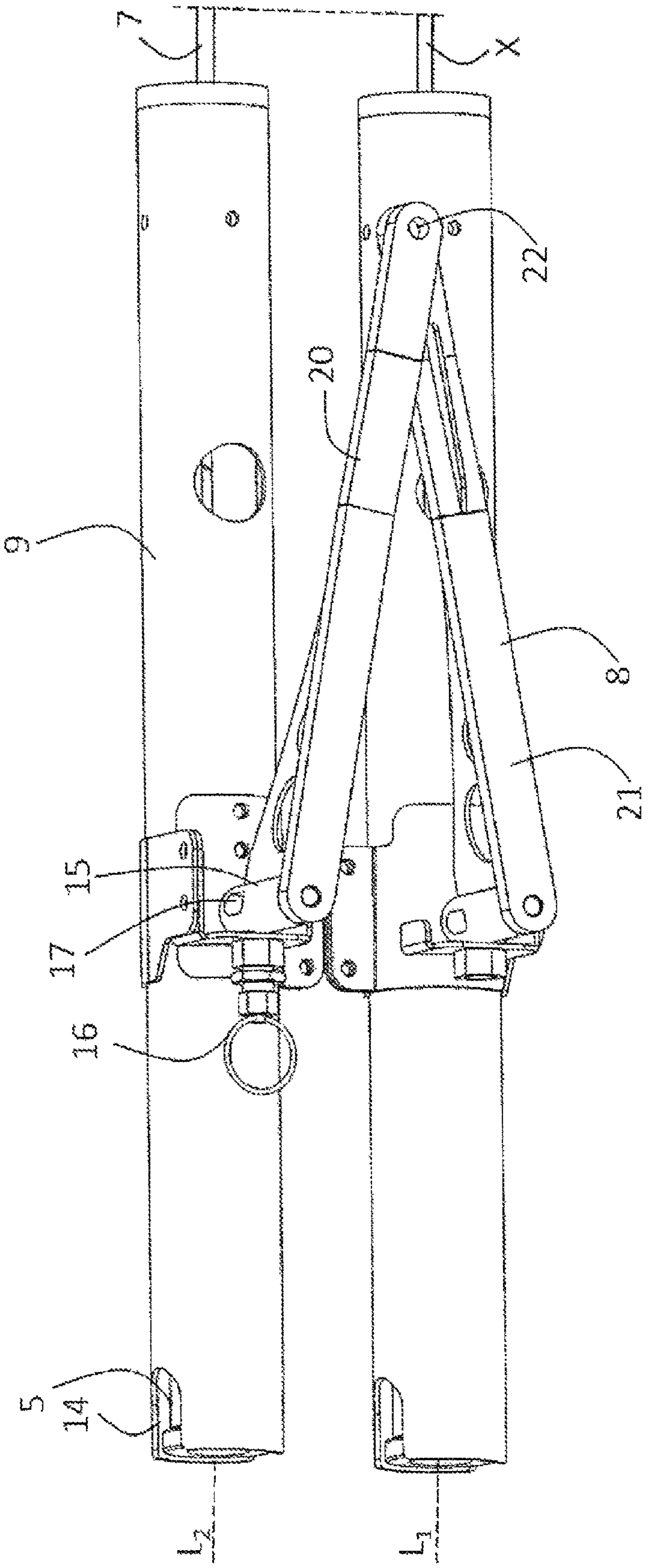
FIG. 9 illustrates, in a bottom perspective view, the constituent elements illustrated in FIG. 8.
Figure 10:
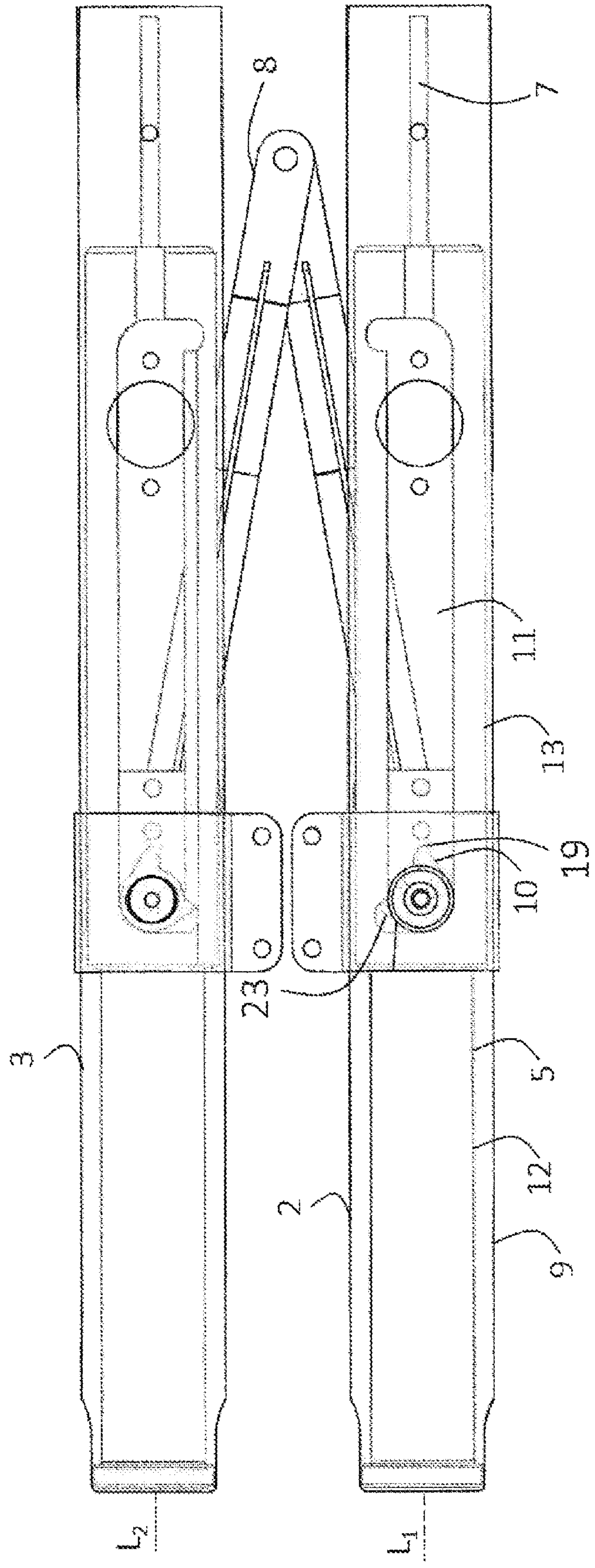
FIG. 10 illustrates, in a top view, the constituent elements illustrated in FIG. 8, with the difference that the sections and the clamps have been made partly transparent.
Figure 12:
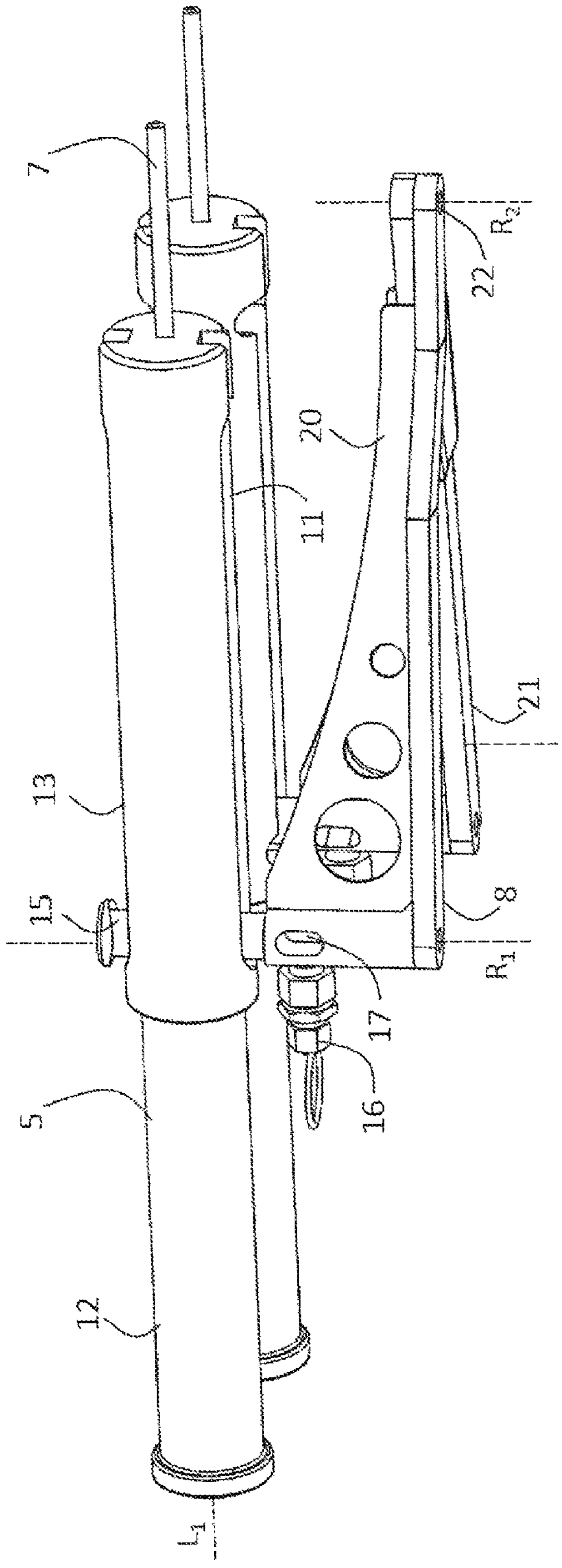
FIG. 12 illustrates, in a side perspective view, the constituent elements illustrated in FIG. 11.
Figure 13:
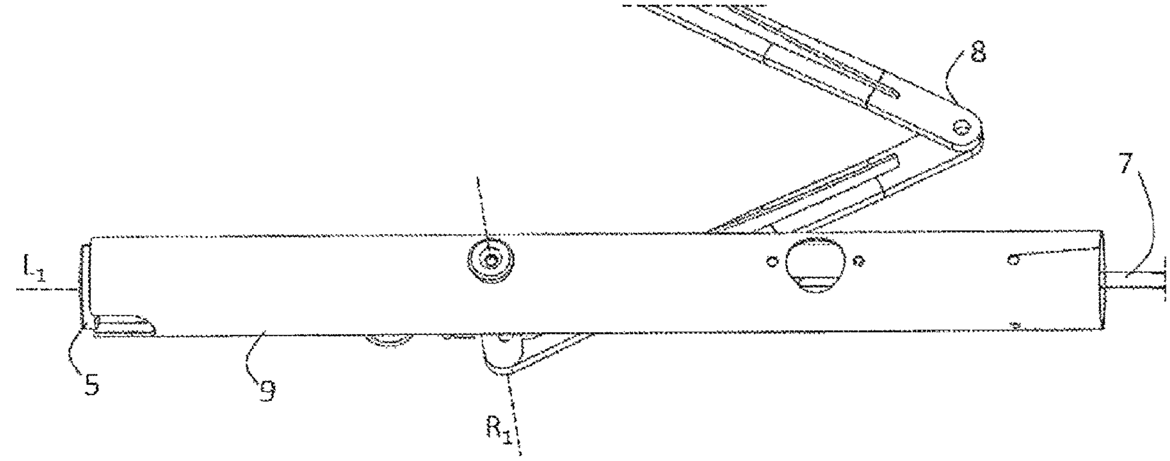
FIG. 13 illustrates, in a top perspective view, an enlargement of a detail of constituent elements illustrated in FIG. 6, also corresponding to a detail of constituent elements illustrated in FIG. 8 with the difference that the first crosspiece is no longer in the maximum retracted configuration but in the non-maximum retracted configuration.

According to a particular embodiment of the invention, illustrated in the figures, said first crosspiece 8 comprises at least one first cam 10, said first end element 5 comprising a first housing 11 which accommodates said first cam 10, the latter being designed to circulate within said first housing 11 between a first extreme stop position, in said retracted configuration, and a second extreme stop position, in said deployed configuration. The first extreme stop position is for example illustrated in FIGS. 10 to 12, as well as in a less immediately visible manner (due in particular to the fact that the first section 9 hides the first cam 10 and the first housing 11), in FIGS. 5, 8 and 9, while the second extreme stop position is for example illustrated in FIGS. 1 to 4, 17 and 20. When said first cam 10 is in said first extreme stop position, said retracted configuration is advantageously maximal. When said first cam 10 positioned within first housing 11 between said first and second extreme stop positions, said retracted configuration is advantageously intermediate, as illustrated in FIGS. 14 and 16, as well as in a less visible manner (due in particular to the fact that the first section 9 hides the first cam 10 and the first housing 11), in FIGS. 6, 13 and 15.

Advantageously, said first housing 11 extends substantially longitudinally along said first longitudinal direction $L_1$, and therefore comprises at least one groove, one end of which forms said first extreme stop position, and the other end of which forms said second extreme stop position. Said first cam 10 is thus preferably designed to at least perform, with respect to the first end element 5, a translation along said first longitudinal direction $L_1$ when it circulates between said first and second extreme positions. In other words, said first end element 5 is thus advantageously designed to at least achieve, relative to said first cam 10, a translation in said first longitudinal direction $L_1$ when said first cam 10 circulates between said first and second extreme positions.

Figure 11:
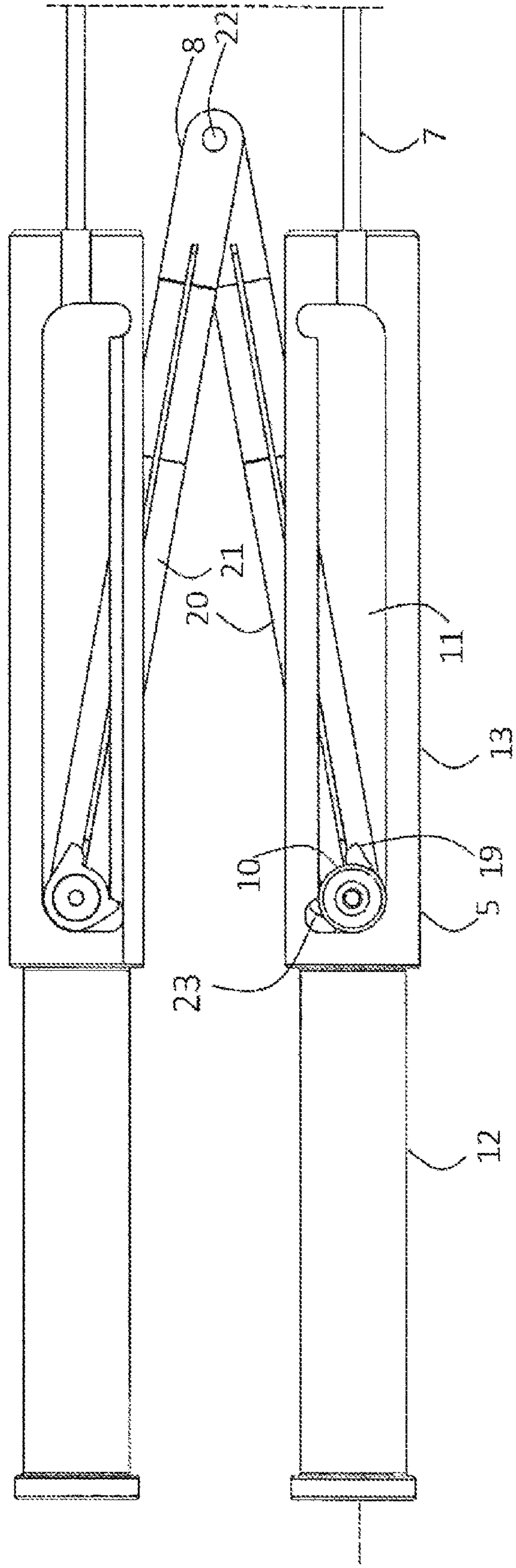
FIG. 11 illustrates, in a top view, part of the constituent elements illustrated in FIG. 10, the transparent elements in the latter figure no longer being shown.
Figure 14:
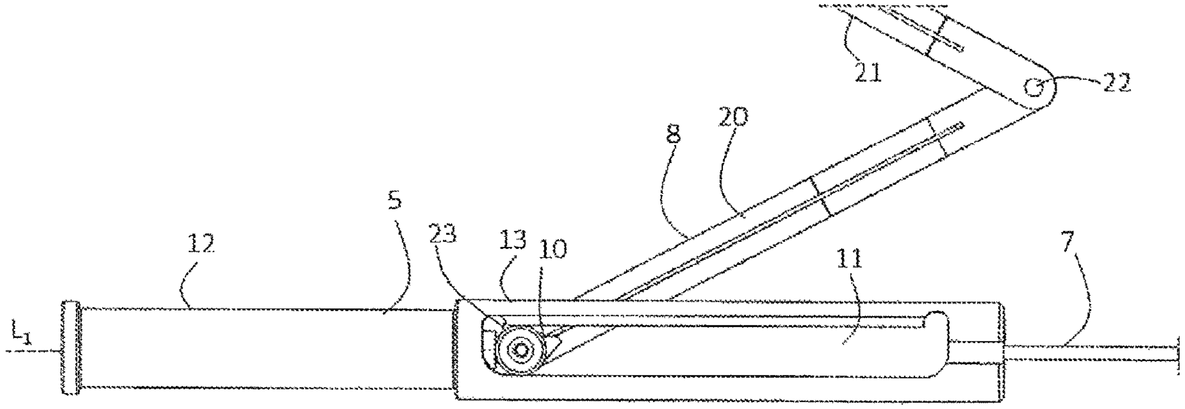
FIG. 14 illustrates, in a top view, the constituent elements illustrated in FIG. 13, with the difference that the first section is not shown.
Figure 16:
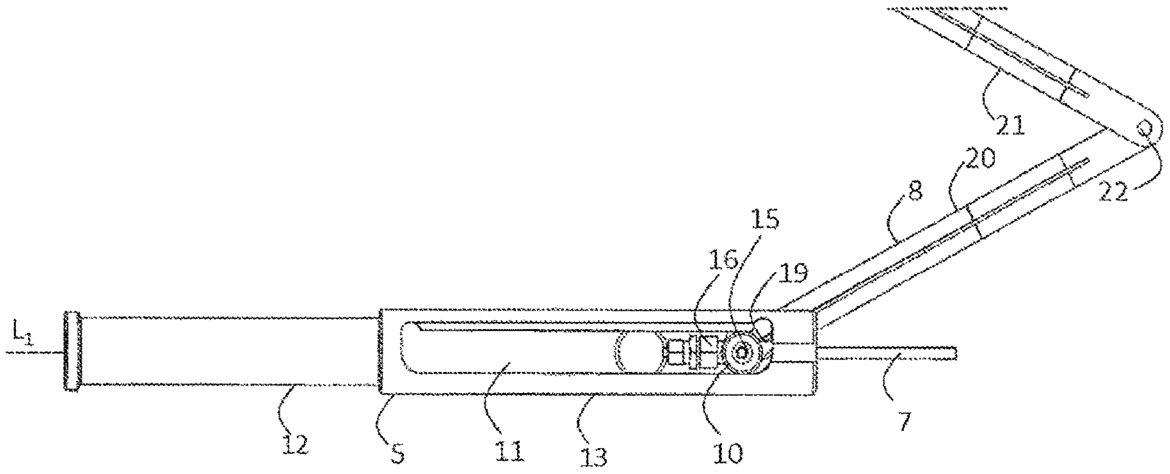
FIG. 16 illustrates, in a top view, the constituent elements illustrated in FIG. 15, with the difference that the first section is not shown.
Figure 17:
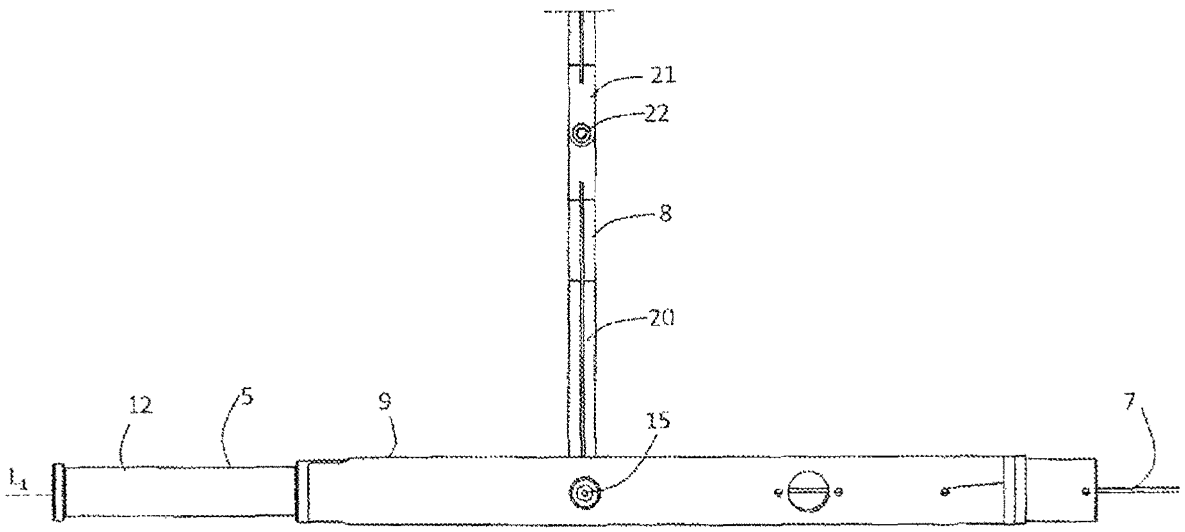
FIG. 17 illustrates, in a top view, an enlargement of a detail of the constituent elements illustrated in FIG. 2, also corresponding to a detail of the constituent elements illustrated in FIG. 15 with the difference that the first crosspiece is no longer in the retracted configuration but in the deployed configuration.
Figure 18:
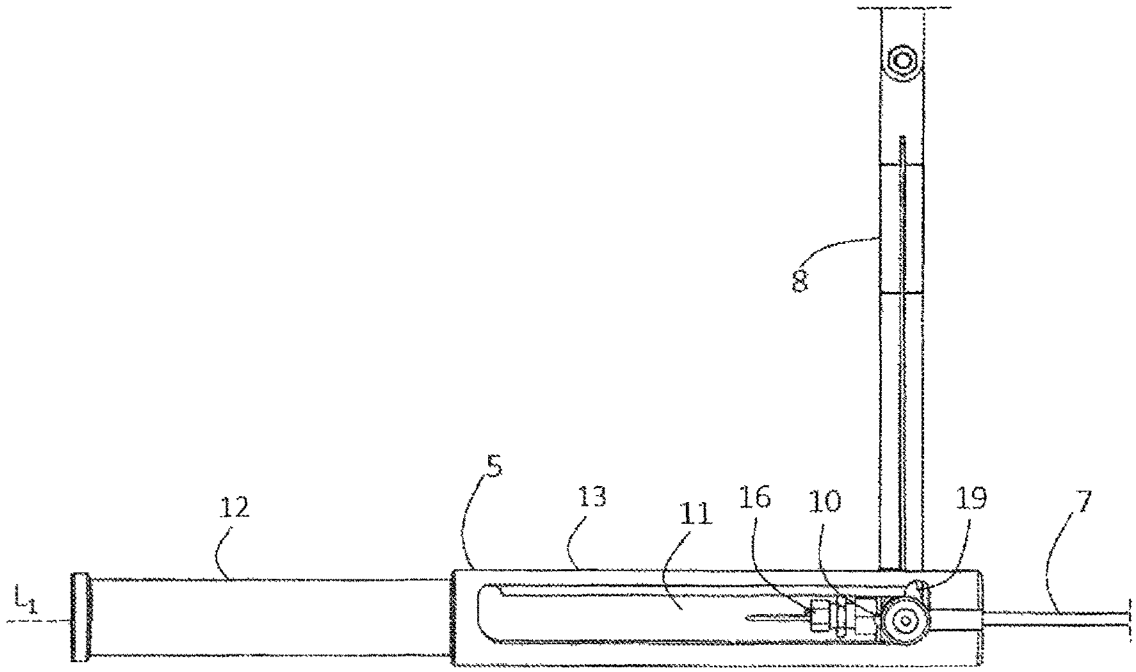
FIG. 18 illustrates, in a top view, the constituent elements illustrated in FIG. 17, with the difference that the first section is not shown.
Figure 19:
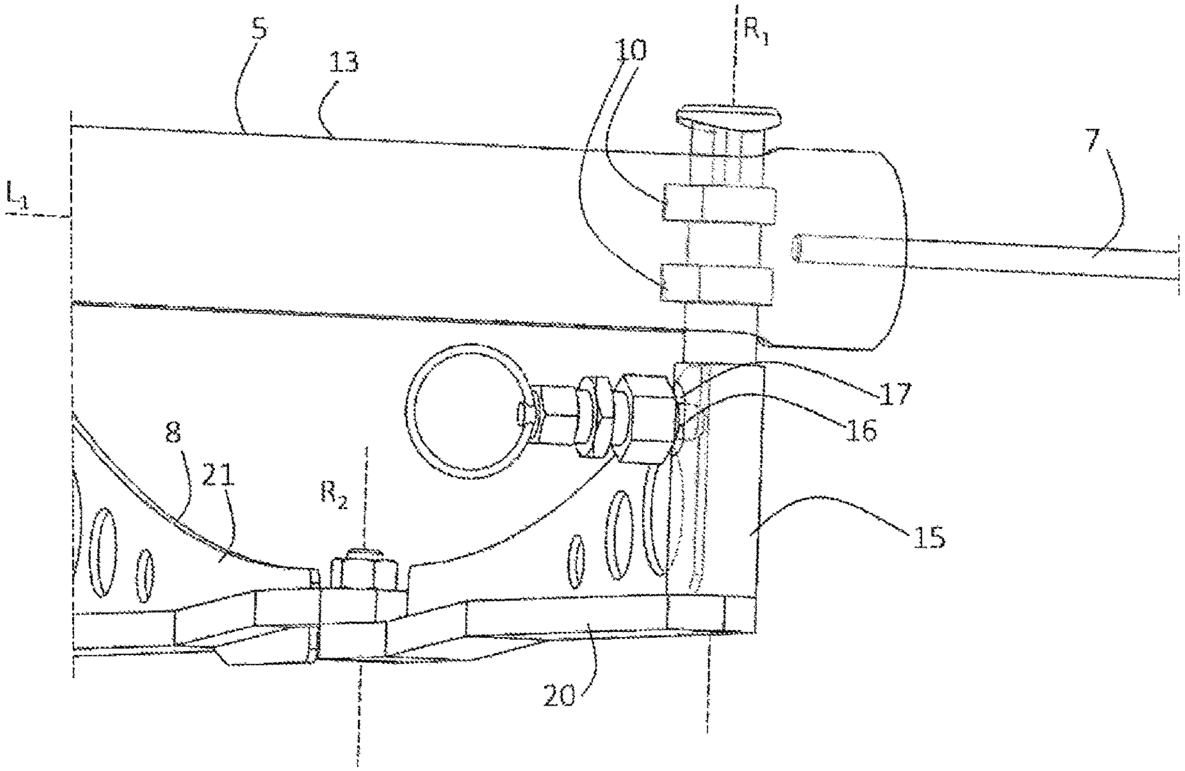
FIG. 19 illustrates, according to a side perspective view, an enlargement of a detail of the constituent elements of FIG. 18, the end element and the shaft having been made partially transparent.
Figure 20:
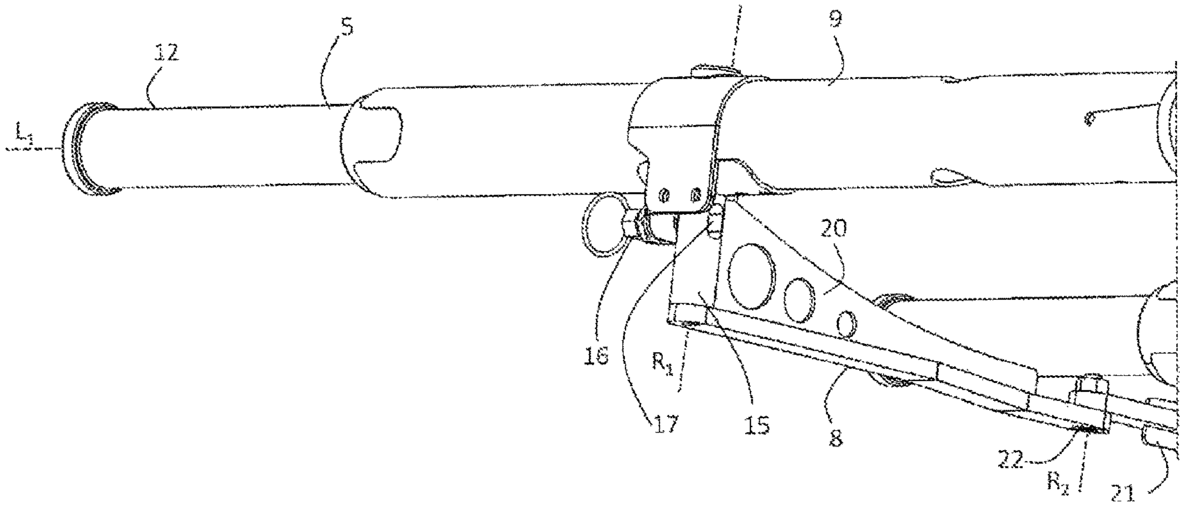
FIG. 20 illustrates, in a side perspective view, an enlargement of a detail of the constituent elements illustrated in FIG. 2.

Thus, advantageously, when mounting the stretcher 1, the first cam circulates 10 within said first housing 11, from the first extreme stop position, as illustrated in FIG. 11, to a first intermediate position, as shown in FIG. 14, then to a second intermediate position, as shown in FIG. 16, and finally arrives at the second extreme stop position, as shown in FIG. 18. Thus, advantageously, during the dismounting of the stretcher 1, the first cam 10 circulates within said first housing 11, from the second extreme stop position, to a second intermediate position, then to a first intermediate position, and finally arrives at the first extreme stop position. In the first extreme stop position and the first and second intermediate positions, the first crosspiece 8 is advantageously in the retracted configuration. Said first cam 10 comprises, according to a particular variant illustrated in particular in FIG. 19, a double cam, that is to say it comprises at least two substantially similar cam elements. This allows better (mechanical) cooperation between the first end element 5 and the first cam 10.

According to an advantageous embodiment of the invention, said first end element 5 cooperates (mechanically) at least with at least one of said first sections 9, so that in the retracted configuration said first end element 5 and first section 9 are connected together by a mechanical connection allowing at least one degree of freedom in translation in said first longitudinal direction $L_1$, and so that in the deployed configuration said mechanical connection inhibits at least said degree of freedom in translation in said first longitudinal direction $L_1$. Thus, when said degree of freedom in translation is authorized, in the retracted configuration, said first cam 10 advantageously circulates within said first housing 11, and is for example preferably in said first extreme stop position, in said first intermediate position, or in said second intermediate position. Moreover, when said degree of freedom in translation is inhibited, in the deployed configuration, said first cam 10 is advantageously blocked in position within said first housing 11, preferably in said second extreme stop position. According to a particular variant, said mechanical connection forms between said first end element 5 and said first section 9, a sliding connection in said first longitudinal direction $L_1$ when the first crosspiece 8 is in the retracted configuration, and a fixed connection (or embedding) when the first crosspiece 8 is in the deployed configuration. In a particularly advantageous manner, said first end element 5 has at least one insertion portion 12 designed to:

- in said retracted configuration, able to be inserted within said first section 9 by translation in said first longitudinal direction $L_1$, as illustrated in FIGS. 5, 6, 8 to 10 and 13,
- in said deployed configuration, be positioned outside of said first section 9, as illustrated in FIGS. 1, 2, 3, and 17 to 20.

According to an advantageous variant of the invention, said insertion portion 12 forms a handle of said stretcher 1. Preferably, said first end element 5 further has an internal portion 13, said internal portion 13 being designed to remain inserted within said first section 9 in the retracted configuration and in the deployed configuration. Thus, the first cam 10 advantageously allows the first end element 5 in which it is inserted, to perform a relaxation translation along said first longitudinal direction $L_1$, the first end element 5 being inserted within the first section 9 until the first cam 10 reaches said first extreme stop position, the first cable 7 then being relaxed, and the first end element 5 therefore no longer being able to sink any further into the first section 9 (the internal portion 13 and the insertion portion 12 are inserted within the first section 9). The first cam 10 therefore preferentially allows the first end element 5 in which it is inserted, to perform a tension translation along said first longitudinal direction $L_1$, the first end element 5 being inserted within the first section 9 until the first cam 10 reaches said second extreme stop position, the first cable 7 then being stretched (preferably to the desired maximum), and the first end element 5 therefore no longer being able to be extracted any further out in the first section 9 (the internal portion 13 remains inserted, while the insertion portion 12 is outside the first section 9).

Figure 15:
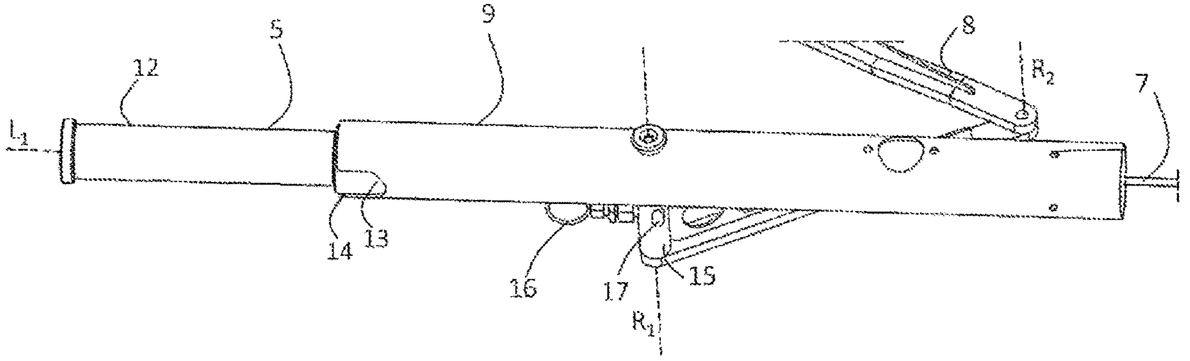
FIG. 15 illustrates, in a top perspective view, an enlargement of a detail of constituent elements illustrated in FIG. 6, also corresponding to a detail of constituent elements illustrated in FIG. 13 with the difference that the end element is no longer fully inserted within the first section but partly outside the latter.

Preferably, said first end element 5 has a generally cylindrical shape, advantageously extending along the first longitudinal direction $L_1$. Said insertion portion 12 and internal portion 13 preferably also have a respective cylindrical shape, extending one behind the other and one attached to the other in the first longitudinal direction $L_1$. When the first end element 5 is in the retracted configuration (and in particular in a partially retracted configuration), the insertion portion 12 can also be positioned outside of said first section 9, as illustrated in FIGS. 15 and 16.

Thus, advantageously, said first end element 5 is (at least partly) designed to slide within said first section 9 so that at least part (the insertion portion 12) of the first end element 5 can be inserted within said first section 9 or outside the latter, depending on whether said first crosspiece 8 is, respectively, in the retracted (in particular maximum) or deployed configuration. Such a configuration makes it possible to improve the compactness of said stretcher 1 when not in use, that is to say dismounted, and in particular in the retracted configuration (advantageously maximum). The first section 9 with which the first end element 5 cooperates is advantageously provided, at its end furthest from another first section 9, with one or more notches 14, which in particular make it easier to grasp the first end element 5 when it is inserted (completely in particular) within the first section 9. Said first end element 5 can thus be, in the retracted configuration, completely inserted within the first section 9.

According to an advantageous embodiment, the stretcher 1 is designed so that, when said insertion portion 12 is extracted from said first section 9, or at least when most of said insertion portion 12 is extracted from said first section 9, the first cable 8 undergoes a first tensioning, which is easy to manually perform, that is to say it requires only minimal physical effort of the user, the tension of the cable being then advantageously not maximum (that is to say according to a desired maximum voltage, and preferably pre-calibrated, predetermined). In addition, said insertion portion 12, when it constitutes a handle, makes it possible to protect the latter during the storage and the transport of the stretcher 1 (that is to say when the latter is folded and/or dismounted).

Advantageously, said first crosspiece 8 cooperates (mechanically) at least with said first arm 2 so that, in the retracted configuration, said first crosspiece 8 and said first arm 2 are connected together by a mechanical connection allowing at least one degree of freedom in rotation along a first axis of rotation $R_1$. Thus, preferably, in the retracted configuration, at least part of the first crosspiece 8 is designed to be able to rotate, relative to said first arm 2, along said first axis of rotation $R_1$. Said first crosspiece 8 is preferably rotatably mounted, along said first axis of rotation $R_1$, with said first arm 2, and more precisely with said first section 9 (the one that cooperates mechanically with the first end element 5), said rotation being advantageously authorized in the retracted configuration, but prohibited in the deployed configuration. In other words, said mechanical connection allowing at least one degree of freedom in rotation along the first axis of rotation $R_1$ is preferably made directly between said first section 9 and said first crosspiece 8. Thus, the first crosspiece 8 advantageously comprises a first shaft 15 rotatably mounted along said first axis of rotation $R_1$ with said first arm 2 (said first shaft 15 preferably being connected directly in rotation with said first arm 2, without intermediate element therebetween), and more advantageously with said first section 9.

Advantageously, in said retracted position, the mechanical connection between the first end element 5 and said first crosspiece 8 allows the first shaft 15 to slide relative to said first end element 5 along the first longitudinal direction $L_1$, while in said deployed position, the mechanical connection between the first end element 5 and said first crosspiece 8 inhibits the sliding of the first shaft 15 with respect to said first end element 5 in the first longitudinal direction $L_1$.

Preferably, the first shaft 15 is positioned at least partially within said first end element 5. This advantageously allows the first shaft 15 to enter into mechanical interaction with the first end element 5, for example via said first cam 10.

Said first shaft 15 advantageously embeds said first cam 10, which therefore also advantageously undergoes, in the retracted configuration, and in particular between said first extreme stop position and said first intermediate position, and between said second intermediate position and said second extreme stop position, a rotation along said first axis of rotation $R_1$, within said first housing 11.

According to a particular variant of the invention, the stretcher 1 comprises a first blocking system 16, 17 designed to, in the deployed configuration, inhibit at least said degree of freedom in rotation according to said first axis of rotation $R_1$. Said first blocking system 16, 17 comprises for example, as illustrated in the figures, at least one male blocking means 16, for example an indexing finger 16 carried by said first arm 2, and a female blocking means 17, for example formed by an orifice 17 provided in said first crosspiece 8, and more precisely in said first shaft 15. Said orifice 17 may be substantially through, as illustrated in the figures. Said male 16 and female 17 blocking means are therefore designed to cooperate in order to block, preferably reversibly, the rotation, according to said first axis of rotation $R_1$, of said first crosspiece 8 relative to said first arm 2 (and more precisely relative to said first section 9), when the first crosspiece 5 is in the deployed configuration. Said male blocking means 16 is therefore preferentially carried by said first arm 2, and more precisely attached to said first section 9.

Thus, said first crosspiece 8 is designed to be able to be rotated to a rotating blocking position, in which the blocking system 16, 17 inhibits at least said degree of freedom in rotation according to said first axis of rotation $R_1$. For example, the indexing finger 16, out of the blocking position and during the rotation of the first shaft 15 according to said first axis of rotation $R_1$, is designed to slide about said first shaft 15 until it reaches said blocking position, in which it is facing the orifice 17 and can penetrate within the latter, thus blocking the rotation of said first shaft 15 according to said first axis of rotation $R_1$. FIGS. 11, 14 and 16 illustrate unblocked positions, while FIGS. 17 to 20 illustrate the blocking position. This advantageously corresponds to the deployed configuration of said first crosspiece 8. Said blocking position advantageously corresponds to said second extreme position of said first cam 10.

Preferably, and therefore in said deployed configuration (and therefore in said blocking position, as well as in said second extreme stop position), said first cam 10 is designed to inhibit at least the degree of freedom in translation in said first longitudinal direction $L_1$ of said first end element 5 with respect to said first crosspiece 8. For this purpose, the first cam 10 comprises for example a first stop finger 19 designed to cooperate (mechanically) with the first housing 11 in order to inhibit at least the degree of freedom in translation, in said first longitudinal direction $L_1$, of said first end element 5 with respect to said first crosspiece 8 and/or said first section 9. Such a deployed configuration is therefore illustrated in FIGS. 1 to 4 and 17 to 20. The first finger 19 is preferably designed to abut with the interior of said first housing 11 when the first cam 10 passes from the second intermediate position to the second extreme position.

Advantageously, said first crosspiece 8 comprises at least one first and one second crosspiece body 20, 21 connected together by a mechanical connection allowing at least one degree of freedom in rotation along a second axis of rotation $R_2$. Said second axis of rotation $R_2$ is preferably separate and distant from said first axis of rotation $R_1$, and more precisely separated from the latter by said first crosspiece body 20. Said first crosspiece 8 comprises for example a first joint 22 (that is to say a hinge, or a means of pivoting), which makes it possible in particular to perform said mechanical connection allowing the degree of freedom in rotation along the second axis of rotation $R_2$. Said first and second crosspiece bodies 20, 21 are preferably connected to each other via said joint 22. Said retracted configuration advantageously corresponds to a collapsed configuration of said first crosspiece 8 in which said first and second crosspiece bodies 20, 21 are collapsed at least in part towards each other to form therebetween a first angle, for example strictly less than 180°. Said deployed configuration preferably corresponds to an unfolded configuration of said first crosspiece 8 in which said first and second crosspiece bodies 20, 21 are unfolded at least partly away from each other to form a second angle therebetween substantially greater than said first angle, said second angle being for example substantially equal to 180°. Said first and second angles are preferably measured on the same side, and correspond to the same angle measured when the first crosspiece 8 is respectively in the retracted configuration or in the deployed configuration. The first angle is for example comprised between 5 and 180° excluded and can vary. The second angle is for example greater than or equal to 180°, for example between 180° and 220° inclusive, and preferably does not vary, the deployed configuration corresponding, as indicated, advantageously to a blocking position. The first crosspiece body 20 is therefore advantageously connected on the one hand, via one end, to said joint 22, and on the other hand, via another end opposite the previous one, to said first shaft 15.

Thus, advantageously, when the first shaft 15 (with the first cam 10) is rotated, from the retracted configuration to the deployed configuration, along the first axis of rotation $R_1$, the first crosspiece 8 is unfolded, that is to say said first and second crosspiece bodies 20, 21 rotate relative to each other along the second axis of rotation $R_2$, the first and second crosspiece bodies 20, 21 forming therebetween an angle which increases to a maximum (which forms the second angle) where the first crosspiece body 20 is blocked at least in rotation (along the first axis of rotation $R_1$), and preferably in position, relative to the first section 9 and/or to the first end element 5. In the deployed configuration, said first crosspiece body 20 is advantageously designed to be blocked at least in rotation, along second axis of rotation $R_2$, with respect to said second crosspiece body 21.

Advantageously, said first and second axes of rotation $R_1$, $R_2$ are substantially parallel to each other (and distant from each other). Preferably, said first axis of rotation $R_1$ is substantially perpendicular to said first longitudinal direction $L_1$. Said first axis of rotation $R_1$ and first longitudinal direction $L_1$ may intersect, as illustrated in the figures. The first sections 9 and the first and second end elements 5, 6 preferably each have an elongated shape extending along said first longitudinal direction $L_1$. The various elements forming the first and second arms 2, 3 advantageously have, for the most part (with the exception of the cables 7 of course), their own mechanical strength, and are for example made of metal or polymer. In particular, the first crosspiece 8, the first sections 9 and the first and second end elements 5, 6 are for example made of metal (steel, etc.) or of polymer, and moreover, they are advantageously rigid, that is to say they have their own mechanical strength.

The operation and the use of a stretcher 1 according to the embodiment illustrated in the figures will now be described in the following. Said stretcher 1 is to begin completely dismounted, that is to say the first crosspiece 8 is in the maximum retracted configuration, corresponding in particular to FIGS. 5 and 8 to 12, the insertion portion 12 then being inserted into the first section 9, and therefore generally hidden. In this last configuration, which also corresponds to the first extreme stop position, the first cam 10 comprises a second stop finger 23 cooperating with the first housing 11 to prevent an unwanted movement, in translation according to a first direction of the first longitudinal direction $L_1$, of the first end element 5 with respect to the first cam 10, while the body of the cam 10 prevents the translation, in a second direction of the first longitudinal direction $L_1$, of the first end element 5 with respect to the first cam 10. A user then pulls or pushes on the first crosspiece 8 so as to enlarge the angle formed between the first and second crosspiece bodies 20, 21, on the one hand thanks to the joint 22 between the latter, which allows them to perform a rotation along the second axis of rotation $R_2$ relative to each other, and on the other hand thanks to the first cam 10 which performs a rotation, within the first housing 11, along the second axis of rotation $R_2$. The first cam 10 is then in the first intermediate position, illustrated in particular in FIGS. 13 and 14. The second finger 23 does not cooperate, having tilted due to the rotation mentioned above according to the first axis of rotation $R_1$ then no longer cooperates with the first housing 11 to block in translation, and thereby authorizes the circulation, by a translational movement in the first longitudinal direction $L_1$, of the first cam 10 within said first housing 11. The insertion portion 12, which was still inserted within the first section 9, is then extracted from the latter, and the first cam 10 passes from the first intermediate position to the second intermediate position, which is illustrated in particular in FIGS. 15 and 16. To perform this passage, it suffices for the user to pull on the first end element 5, if necessary by catching it using the notches 14 of the first section 9 to pull the first end element 5 out of the latter. The first tensioning of the first cable 7, which is physically easy to achieve, is then carried out, and the latter is at least partly stretched between the first and second end elements 5, 6. The first cam 10 then comes into abutment against one end of the first housing 11, along the first longitudinal direction $L_1$. To finalize the mounting of the stretcher 1 (or in any case of its structure), the user pulls or pushes again on the first crosspiece 8 so as to further increase the angle formed between the first and second crosspiece bodies 20, 21, which therefore formed the first angle, until it formed the second angle, for example equal to approximately 180°. The first cam 10 then performs another rotation along the first axis of rotation 10, and the first stop finger 19 cooperates with the first housing 11 to push the first end element 5 in translation along the first longitudinal direction $L_1$ so as to stretch (even more) the first cable 7, thereby performing a second, final, tensioning of the latter. The first cam 10 is then advantageously designed to be able to be rotated about the first axis of rotation $R_1$ so that the first crosspiece 8 passes from the retracted configuration (more precisely the intermediate position of the first cam 10) to the deployed configuration (corresponding to the second extreme position of the first cam 10) while the first end element 5 performs a final translation in the first longitudinal direction $L_1$ in order to achieve the final tensioning of the first cable 7, and the blocking of the assembly. The orifice 17 with which the first shaft 15 is provided is then facing the indexing finger 16, and the latter is therefore inserted at least partly within said orifice 17, blocking the rotation according to the first axis of rotation $R_1$ of the first shaft 15 and therefore of the first crosspiece body 20 which is attached to said first shaft 15. The first crosspiece 8 (or at least the first crosspiece body 20) is thus in the blocking position. The indexing finger 16, which is carried by the first section 9, therefore blocks the first cam 10 and the first shaft 15 in rotation, while the first cam 10, attached via the first shaft 15 to the first crosspiece body 20, blocks in translation (in the first longitudinal direction $L_1$) the first end element 5. The first crosspiece 8 is then in the deployed configuration, as illustrated in FIGS. 1 to 4 and 17 to 20. The body of the cam 10, and the first finger 19 blocked in rotation thanks to the indexing finger 16, prevent the translation according to the first longitudinal direction $L_1$ of the first cam 10 within the first housing 11, and therefore prevent the translation according to the first longitudinal direction $L_1$ of the first end element 5 vis-à-vis both the first section 9 and the first crosspiece 8. The first section 9, the first end element 5 and the first crosspiece 8 are then in rigid connection (or embedding) as long as the indexing finger 16 is not disarmed, that is to say pulled, thus freeing the orifice 17 and allowing the user to push or pull in order to collapse the first crosspiece 8, that is to say fold the first and second crosspiece body 20, 21 towards each other (the angle formed therebetween then decreases) to return to the retracted configuration.

The stretcher 1 preferably comprises several elements as mentioned above, and in particular said second arm 3 preferably comprises at least one third and one fourth end element 24, 25 as well as at least one second cable 26 attached to said third and fourth end elements 24, 25 and intended to be stretched between the latter in a second longitudinal direction $L_2$, said first crosspiece 8 cooperating at least with said third end element 24 so that in the retracted configuration said third end element 24 and first crosspiece 8 are connected together by a mechanical connection allowing at least one degree of freedom in translation along said second longitudinal direction $L_2$, and so that in the deployed configuration said mechanical connection inhibits at least said degree of freedom in translation along said first longitudinal direction $L_2$. Said second crosspiece body 21 is advantageously rotatably mounted with said second arm 3. Thus, for each crosspiece 8, the stretcher 1 advantageously has a pair of elements equivalent to what has been described for the first end element 5, the blocking system 16, 17, the first sections 9, etc. Thus, the second crosspiece body 21 preferably performs, during the assembly of said stretcher 1, the same rotational movement (symmetrically) as the first crosspiece body 20. The stretcher 1 further preferably comprises a second crosspiece, as illustrated in FIGS. 1 to 4, away from the first crosspiece 8, said second crosspiece has substantially the same operation as the first crosspiece 8, said second crosspiece therefore also being connected to said first and second arms 2, 3. Said first and second arms 2, 3 are advantageously substantially similar, and even symmetrical.

The stretcher 1 of the invention allows, when it is completely dismounted/collapsed (in the maximum retracted configuration), to be stored and transported while having a minimum size, and in the mounted/unfolded configuration, to be used for transporting a person (or equipment) in optimal safety and comfort conditions, while offering optimized duration and ease of assembly.

POSSIBILITY OF INDUSTRIAL APPLICATION

The invention finds its industrial application in the design, manufacture and use of collapsible stretchers.

The invention claimed is:

1. A stretcher (1) comprising at least one first and one second support arm (2, 3) to which and between which a means for receiving an individual (4) is intended to be attached, said first arm (2) comprising at least one first and one second end element (5, 6), as well as at least one first cable (7) attached to said first and second end elements (5, 6) and intended to be stretched between the latter along a first longitudinal direction ($L_1$), said stretcher (1) being characterized in that it comprises at least one first crosspiece (8) connected to said first and second arms (2, 3) and positioned at least partly between the latter, said first crosspiece (8) being designed to move between a retracted configuration and a deployed configuration in which said first crosspiece (8) maintains said first and second arms (2, 3) farther apart than in said retracted configuration, said first crosspiece (8) cooperating at least with said first end element (5) so that in the retracted configuration said first end element (5) and first crosspiece (8) are connected together by a mechanical connection allowing at least one degree of freedom in translation along said first longitudinal direction ($L_1$), and so that in the deployed configuration said mechanical connection inhibits at least said degree of freedom in translation along said first longitudinal direction ($L_1$).

2. The stretcher (1) according to claim 1, characterized in that said first crosspiece (8) comprises at least one first and one second crosspiece body (20, 21) connected together by a mechanical connection allowing at least one degree of freedom in rotation along a second axis of rotation ($R_2$).

3. The stretcher (1) according to claim 2, characterized in that said retracted configuration corresponds to a collapsed configuration of said first crosspiece (8) in which said first and second crosspiece bodies (20, 21) are collapsed at least in part towards each other to form therebetween a first angle, for example strictly less than 180°, and while said deployed configuration corresponds to an unfolded configuration of said first crosspiece (8) in which said first and second crosspiece bodies (20, 21) are unfolded at least partly away from each other to form therebetween a second angle substantially greater than said first angle, said second angle being for example substantially equal to 180°.

4. The stretcher (1) according to claim 1, characterized in that said cooperation between said first end element (5) and said first crosspiece (8) is direct, that is to say said first end element (5) and said first crosspiece (8) interact directly mechanically with each other to form the mechanical connection which connects them.

5. The stretcher (1) according to claim 1, characterized in that said first crosspiece (8) comprises at least one first cam (10), said first end element (5) comprising a first housing (11) which accommodates said first cam (10), the latter being designed to circulate within said first housing (11) between a first extreme stop position, in said retracted configuration, and a second extreme stop position, in said deployed configuration.

6. The stretcher (1) according to claim 1, characterized in that said first arm (2) comprises a plurality of first tubular and hollow sections (9), which are designed to mechanically cooperate with each other, by example by interlocking with each other, in the extension of each other, preferably in said first longitudinal direction ($L_1$).

7. The stretcher (1) according to claim 6, characterized in that said first cable (7) passes through said first sections (9) and therefore connects the latter to said first and second end elements (5, 6).

8. The stretcher (1) according to claim 6, characterized in that said first end element (5) cooperates at least with at least one of said first sections (9), so that in the retracted configuration said first end element (5) and first section (9) are connected together by a mechanical connection allowing at least one degree of freedom in translation in said first longitudinal direction ($L_1$), and so that in the deployed configuration said mechanical connection inhibits at least said degree of freedom in translation along said first longitudinal direction ($L_1$).

9. The stretcher (1) according to claim 8, characterized in that said first end element (5) has at least one insertion portion (12) designed to:

- in said retracted configuration, be able to be inserted within said first section (9) by translation along said first longitudinal direction ($L_1$),
- in said deployed configuration, be positioned outside of said first section (9).

10. The stretcher (1) according to claim 9, characterized in that said insertion portion (12) forms a handle of said stretcher (1).

11. The stretcher (1) according to claim 1, characterized in that said first crosspiece (8) cooperates at least with said first arm (2) so that in the retracted configuration, said first crosspiece (8) and said first arm (2) are connected together by a mechanical connection allowing at least one degree of freedom in rotation along a first axis of rotation ($R_1$).

12. The stretcher (1) according to claim 11, characterized in that it comprises a first blocking system (16, 17) designed to, in the deployed configuration, inhibit at least said degree of freedom in rotation along said first axis rotation ($R_1$).

13. The stretcher (1) according to claim 12, characterized in that said first blocking system (16, 17) comprises at least one male blocking means (16), for example an indexing finger (16) carried by said first arm (2), and a female blocking means (17), for example formed by an orifice (17) provided in said first crosspiece (8), said male (16) and female (17) blocking means therefore being designed to cooperate in order to block, preferably reversibly, the rotation, according to said first axis of rotation ($R_1$), of said first crosspiece (8) relative to said first arm (2).

14. The stretcher (1) according to claim 11, characterized in that said first crosspiece (8) is rotatably mounted, according to said first axis of rotation ($R_1$), with said first section (9).

15. The stretcher (1) according to at least claim 11, characterized in that the first crosspiece (8) advantageously comprises a first shaft (15) rotatably mounted along said first axis of rotation ($R_1$) with said first arm (2).

16. The stretcher (1) according to claim 15, characterized in that in the retracted position, the mechanical connection between the first end element (5) and said first crosspiece (8) allows the first shaft (15) to slide relative to said first end element (5) in the first longitudinal direction ($L_1$), while in said deployed position, the mechanical connection between the first end element (5) and said first crosspiece (8) inhibits the sliding of the first shaft (15) relative to said first end element (5) along the first longitudinal direction ($L_1$).

17. The stretcher (1) according to claim 15, characterized in that the first shaft (15) is positioned at least partly within said first end element (5).

* * * * *